United States Patent [19]

Dierichs et al.

[11] Patent Number: 4,639,475
[45] Date of Patent: Jan. 27, 1987

[54] ADHESIVE STICK AND A PROCESS FOR ITS PRODUCTION

[75] Inventors: Wolfgang Dierichs, Duesseldorf; Gerhard Gierenz, Solingen; Gabriella Kraus, Neuss, all of Fed. Rep. of Germany

[73] Assignee: Henkel Kommanditgesellschaft auf Aktien, Duesseldorf, Fed. Rep. of Germany

[21] Appl. No.: 601,183

[22] Filed: Apr. 17, 1984

[30] Foreign Application Priority Data

Aug. 4, 1983 [DE] Fed. Rep. of Germany ....... 3328099

[51] Int. Cl.$^4$ ........................... C08F 3/56; C08F 29/12
[52] U.S. Cl. .................................... 523/164; 524/135; 524/131; 524/141; 524/238; 525/327.7; 525/327.8; 525/340; 526/910; 526/911
[58] Field of Search ............... 523/164; 524/238, 135, 524/131, 141; 525/327.7, 327.8.340; 526/910, 911

[56] References Cited

U.S. PATENT DOCUMENTS

| Re. 30,747 | 4/1971 | Dierichs | 260/22 |
|---|---|---|---|
| 3,576,776 | 4/1971 | Dierichs | 260/22 |
| 3,679,623 | 7/1972 | Mestetsky et al. | 524/135 |
| 3,846,363 | 11/1974 | Ando et al. | 524/108 |

FOREIGN PATENT DOCUMENTS 2311746 9/1974 Fed. Rep. of Germany .

OTHER PUBLICATIONS

European Search Report (84-108892.5)
GAF Technical Bulletin 7583-031, copyright 1967.
AFAC, "Phosphate Ester Surfactants as Drycleaning Detergents", copyright 1973.

*Primary Examiner*—John Kight
*Assistant Examiner*—M. L. Moore
*Attorney, Agent, or Firm*—Ernest G. Szoke; Henry E. Millson, Jr.

[57] ABSTRACT

The invention relates to an adhesive stick of an adhesive resin dissolved and/or dispersed in an aqueous solvent system and containing a gel-forming component and, if desired, other standard additives. The new adhesive stick is characterized in that its adhesive layers applied by rubbing onto a receiving surface show permanently tacky pressure-sensitive adhesive properties and in that the stick contains the reaction product of sorbitol and/or xylitol and benzaldehyde as the gel-forming component and, as adhesive resin, a reaction mixture from the reaction of methyl vinyl ether/maleic acid anhydride copolymers with partially neutralized acid phosphate esters of nonionic wetting agents of the lower alkylene oxide adduct type.

10 Claims, 1 Drawing Figure

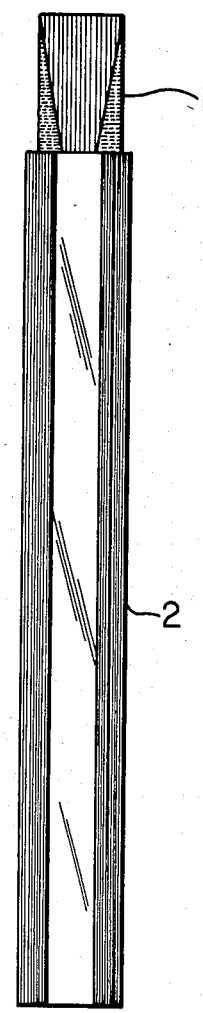

ADHESIVE STICK AND A PROCESS FOR ITS PRODUCTION

BACKGROUND OF THE INVENTION

This invention relates to a new soft-rubbing adhesive stick for applying an adhesive film having permanently tacky, pressure-sensitive adhesive properties.

The literature has long contained numerous proposals for the production of adhesives in stick form which are said to be suitable for bonding a variety of substrates, but especially paper. Practical significance has been acquired above all by a certain type of adhesive sticks such as those which contain an aqueous polyvinyl pyrrolidone solution as adhesive component accommodated in a soap gel, particularly sodium stearate, as the shaping gel-forming component. Sticks of this type are described in particular in German Patent No. 18 17 985. U.S. Pat. No. 3,576,776 and its reissue No. Re. 30747 correspond to this German patent.

There has been no shortage of attempts to replace the soap gel forming the rigid stick substance by other gel-forming components. German Patent No. 22 04 482 proposes using the reaction product of sorbitol and benzaldehyde as the gel-forming component, particular importance being attributed to dibenzal-sorbitol. So far as the adhesive resins are concerned, the disclosure of this patent is in the same category as the teaching of the above-mentioned German Patent No. 18 17 985. In this case, too the adhesive resins used are tacky solutions, thickened to stick consistency, obtained by dissolving synthetic resins in water or in aqueous mixtures of organic solvents.

The adhesive components used in the above-mentioned patents receive their tackiness through the mixing or dissolution of the adhesive resin with or in the solvent or solvent mixture. If the solvent evaporates or escapes otherwise from the adhesive mass, for example through absorption of the liquid components into the coated paper, the adhesive-containing mass loses its tackiness. Accordingly, only a limited amount of time is available for applying adhesive coatings of the type applied by rubbing, for example onto paper, union with the material to be bonded having to take place within that time.

Adhesive resin components having fundamentally different properties, namely permanently tacky pressure-sensitive adhesive properties, are known from the technology of adhesives. Although adhesive mixtures based on permanently tacky resins such as these also generally contain more or less limited quantities of, for example, an aqueous solvent phase for the application process, no real significance is attributed to this solvent content. The adhesive or adhesive mixture retains its pressure-sensitive adhesive properties even when the liquid phase has escaped from the adhesive layer applied. Adhesive systems of this type are based on permanently tacky resin components which are distinguished by extreme softness and high tack, even in the solvent-free state, and which nevertheless are capable of forming sufficiently firm bonds. By suitably formulating the adhesive layer, provision can be made on the one hand for the formation of temporary bonds and, on the other hand, for the formation of such firm bonds that paper bonds, for example, can only be destroyed by tearing the paper.

Pressure-sensitive adhesive resins of the type in question with their permanently tacky adhesive properties have never been proposed before for the production of adhesive sticks. This is not surprising. A crucial requirement for the conversion and use of adhesives in stick form is a comparatively high hardness value of the adhesive composition which ensures that the stick as such does not change its shape in use, the adhesive being rubbed off from the stick at its end. However, the serviceability of a pressure-sensitive contact adhesive and particularly its tack are critically dependent on the soft tackiness of adhesive resin components of the type in question here.

OBJECTS OF THE INVENTION

An object of the present invention is to provide, in stick form, adhesive materials of the type which, when rubbed on a receiving surface, produce pressure-sensitive adhesive layers characterized by permanent tackiness. It has surprisingly been found that the materialization of this concept, which in fact is self-contradictory, is possible through the choice of a certain adhesive component and its combination with a certain gel-forming component.

Another object of the present invention is the obtaining of an adhesive applicator crayon or stick comprised of and adhesive resin dissolved and/or dispersed in an aqueous solvent system, a gel-forming component and, optionally, other conventional additives for adhesive applicator crayons or sticks, whereby, when applied by rubbing onto a receiving surface, the adhesive layer produced has permanently tacky pressure-sensitive adhesive properties, said adhesive applicator crayon or stick consisting essentially of the reaction product of sorbitol and/or xylitol and benzaldehyde, as said gel-forming component, and the reaction mixture from the reaction of methyl vinyl ether/maleic acid anhydride copolymers with partially neutralized acid phosphate esters of nonionic wetting agents of the lower alkylene oxide adduct type, as said adhesive resin.

A yet further object of the present invention is the development of a process for the production of an adhesive applicator crayon or stick comprised of an adhesive resin dissolved and/or dispersed in an aqueous solvent system, a gel-forming component and, optionally, other conventional additives for adhesive applicator crayons or sticks, whereby, when applied by rubbing onto a receiving surface, the adhesive layer produced has permanently tacky pressure-sensitive adhesive properties comprising the steps of (a) heating an aqueous mixture of partially neutralized acid phosphate esters of nonionic wetting agents of the lower alkylene oxide adduct type (pH-value of a 10% solution of the phosphate esters being from 5 to 6) to a temperature of 80° to 100° C., (b) adding to said heated aqueous mixture a methyl vinyl ether/maleic acid anhydride copolymer, as said adhesive resin, in the form of a fine powder with stirring, (c) allowing said aqueous mixture to react at said temperature for from 10 to 90 minutes, (d) stirring in a liquid alcohol or ether solvent, (e) adding a gel-forming amount of the reaction product of sorbitol and/or xylitol and benzaldehyde, as said gel-forming component, dissolved in a strongly polar solvent, (f) homogenizing the mixture at said temperature, (g) solidifying said homogeneous mixture by cooling into the desired shape, and (h) recovering said adhesive applicator crayon or stick.

A yet further object of the present invention involves the use of the above adhesive applicator crayon or stick for applying pressure-sensitive adhesive coatings having permanent tackines to a surface.

These and other objects of the invention will become more apparent as the description thereof proceeds.

FIG. 1 depicts the adhesive applicator crayon or stick of the invention.

DESCRIPTION OF THE INVENTION

Accordingly, the present invention relates to an adhesive applicator crayon or stick of an adhesive resin dissolved and/or dispersed in an aqueous solvent system, a gel-forming component and, if desired, other standard additives. The new adhesive stick according to the invention is characterized in that its adhesive layers rubbed onto a receiving surface have permanently tacky pressure-sensitive adhesive properties and in that the stick contains the reaction product of sorbitol and/or xylitol and benzaldehyde as the gel-forming component known per se and, as adhesive resin, the reaction mixture from the reaction of methyl vinyl ether/maleic acid anhydride copolymers with partly neutralized acid phosphate esters of nonionic wetting agents of the lower alkylene oxide adduct type.

More particularly, the present invention relates to an adhesive applicator crayon or stick comprised of an adhesive resin dissolved and/or dispersed in an aqueous solvent system, a gel-forming component and, optionally, other conventional additives for adhesive applicator crayons or sticks, whereby, when applied by rubbing onto a receiving surface, the adhesive layer produced has permanently tacky pressure-sensitive adhesive properties, said adhesive applicator crayon or stick consisting essentially of the reaction product of sorbitol and/or xylitol and benzaldehyde, as said gel-forming component, and the reaction mixture from the reaction of methyl vinyl ether/maleic acid anhydride copolymers with partially neutralized acid phosphate esters of nonionic wetting agents of the lower alkylene oxide adduct type, as said adhesive resin.

The invention also relates to a process for the production of an adhesive applicator crayon or stick comprised of an adhesive resin dissolved and/or dispersed in an aqueous solvent system, a gel-forming component and, optionally, other conventional additives for adhesive applicator crayons or sticks, whereby, when applied by rubbing onto a receiving surface, the adhesive layer produced has permanently tacky pressure-sensitive adhesive properties comprising the steps of (a) heating an aqueous mixture of partially neutralized acid phosphate esters of nonionic wetting agents of the lower alkylene oxide adduct type (pH-value of a 10% solution of the phosphate esters being from 5 to 6) to a temperature of 80° to 100° C., (b) adding to said heated aqueous mixture a methyl vinyl ether/maleic acid anhydride copolymer, as said adhesive resin, in the form of a fine powder with stirring, (c) allowing said aqueous mixture to react at said temperature for from 10 to 90 minutes, (d) stirring in a liquid alcohol or ether solvent, (e) adding a gel-forming amount of the reaction product of sorbitol and/or xylitol and benzaldehyde, as said gel-forming component, dissolved in a strongly polar solvent, (f) homogenizing the mixture at said temperature, (g) solidifying said homogenous mixture by cooling into the desired shape, and (h) recovering said adhesive applicator crayon or stick.

More specifically, the following may be said of the two essential stick-forming components, namely the adhesive resin and the gel-forming component.

Permanently Tacky, Pressure-Sensitive Adhesive Resin

Reactive, water-soluble, highly viscous copolymers of methyl vinyl ether (MVE) and maleic acid anhydride (MA) characterized by an alternating structure of the two copolymer units differing in their molecular weight ranges have been described and are commercially available. Copolymers of this type having specific viscosities of, for example, from 0.1 to 4.5 (as measured on a solution of 1 g of copolymer in 100 ml of methyl ethyl ketone (MEK) at 25° C.) range from comparatively low to high molecular weights. The copolymer, are reactive by virtue of their maleic acid anhydride groups. Thus, a chemical reaction often takes place merely when the copolymers are dissolved. This chemical reaction, in which the maleic acid anhydride structure is split, results in the formation of polymeric, highly viscous partial esters which have also been proposed for use as a component of adhesives. The adhesive resin used in accordance with the invention is the reaction mixture which accumulates in the reaction of MVE/MA-copolymers of the type in question with partially neutralized acid phosphate esters of nonionic wetting agents of the lower alkylene oxide adduct type.

If nonionic wetting agents of the lower alkylene oxide adduct type are reacted with phosphoric acid or reactive derivatives thereof, a mixture of mono- and di-phosphate esters of the nonionic wetting agents is formed as the anionic reaction product. By partially neutralizing this reaction mixture with sodium hydroxide, for example, it is possible to form partial salts which react substantially neutrally, so that for example the pH-value of a 10% solution of the partially neutralized reaction product at 25° C. is in the pH-range from 5 to 6. The adhesive resin used in accordance with the invention is formed from the reaction of the MVE/MA-copolymer mentioned earlier on with these partially neutralized acid phosphate esters. Permanently tacky pressure-sensitive adhesives are obtained by reacting comparatively large quantities of the partially neutralized acid phosphate ester mixture with only limited quantities of the copolymer. For example, adhesive effects can actually be obtained by reacting at least about 2 parts by weight of the partially neutralized acid phosphate ester mixture with approximately 1 part by weight of the MVE/MA-copolymer. These effects improve with increasing quantities of the phosphate ester, for example 2.5 or 3 parts by weight. The sticks according to the invention preferably contain as adhesive component the reaction mixtures from the reaction of about 4 to 15 parts by weight of the partially neutralized acid phosphate ester mixture with approximately 1 part by weight of the MVE/MA-copolymer, corresponding ratios of about 5 to 12 parts by weight of the phosphate ester mixture to 1 part of the copolymer being particularly suitable. By selecting and coordinating with one another the molecular weight of the copolymer on the one hand and the quantity of the complex phosphate ester on the other hand, it is possible to influence the ultimate properties of the pressure-sensitive adhesive layer. In this way, it is possible on the one hand to form pressure-sensitive adhesive films which enable the bond to be separated without any tearing of the paper, and on the other hand to establish such strong adhesive bonds that the bond can only be destroyed by tearing the paper.

The preferred hydrophobic basis for the synthesis the nonionic wetting agents of the lower alkylene oxide adduct type are aliphatic, cycloaliphatic and/or aromatic alcohols containing preferably 5 to 25 and, more particularly, 6 to 22 carbon atoms in the molecule. Monohydroxy alcohols which are subsequently alkoxylated may be used with advantage. The aliphatic and cycloaliphatic alcohols may be saturated or olefinically unsaturated. Aliphatic alcohols may be straight-chain or branched. Cyclic or aromatic alcohols may be substituted, particularly by alkyl radicals. A particularly preferred hydrophobic basis for the synthesis of the nonionic wetting agents is an alkyl phenol in which the alkyl radical contains in particular from 8 to 12 carbon atoms. In overall terms, the alcohol component containing from 12 to 18 C-atoms in the molecule represents a particularly suitable hydrophobic basis.

The preferred lower alkylene oxide adducts are the corresponding ethylene oxide adducts, although propylene oxide or butylene oxide adducts present in a lower amount than the ethylene oxide adducted alcohol may be employed. Even limited chain lengths of these radicals with, for example, 2 to 15 and, more particularly, 3 to 10 recurring ethylene oxide units are suitable, although longer-chain lower alkylene oxide radicals with, for example, up to 50 alkylene oxide units are also included in the scope of the invention.

The Gel-Forming Component According To The Invention

The gel-forming component used is, above all, the reaction product of sorbitol and/or xylitol with benzaldehyde according to German Patent No. 22 04 482 and, more particularly, dibenzal-sorbitol which is commercially available as a gel-forming substance for a variety of applications. The further details of the teaching according to the invention which are discussed in the following make it possible to combine a sufficiently firm stick structure on the one hand with permanently tacky pressure-sensitive adhesive properties on the other hand.

Further Particulars Of The Invention

It has proved to be advisable to use the synthetic resin component, i.e. the reaction mixture of MVE/MA-copolymer and the partially neutralized acid phosphate ester mixture, in a comparatively large quantity in the new adhesive applicator crayons or sticks. In general, this adhesive resin component makes up more than 50% by weight and preferably at least 60% by weight of the total weight of the stick. This constitutes a significant difference from hitherto known adhesive sticks. Adhesive sticks based on solvent-activated adhesive resins generally contain comparatively small quantities of adhesive resin in conjunction with relatively large quantities of liquid constituents. Thus, according to German Patent No. 22 04 482, it is necessary to use 10 parts by weight of the adhesive resin together with 5 to 40 parts by weight of water and 10 to 60 parts by weight of organic solvents. By contrast, in one particularly preferred embodiment of the invention, the adhesive resin component is used in quantities of from about 65% to 75% by weight, based on the weight of the finished stick.

For formulating and producing the stick, it is an aqueous solvent system of which the details are also preferred in accordance with the invention to use an aqueous solvent system of which the details are discussed in the following in reference to the production of the stick. In contract to the cited prior art, however, the quantity in which the aqueous solvent system is used is comparatively small. Preferably, it makes up at most about 45% by weight of the finished stick and, more particularly, amounts to no more than about 35% by weight. A quantity of about 20% to 30% by weight of the aqueous solvent system, based on the weight of the finished stick, can be particularly suitable. The aqueous solvent system is preferably a homogeneous mixture of (1) water, (2) a liquid having up to 6 carbon atoms selected from the group consisting of alkanols, alkanediols, di-lower alkyl ethers of alkanediols and mono-lower alkyl ethers of alkanediols, and (3) a water-miscible strongly polar solvent.

In contrast to the cited prior art, the rule here, as already emphasized, is that these liquid components are only of significance in the production and finishing of the stick. The presence of the liquid phase is not crucial to the development of the adhesive behavior. If the stick material is spread in the form of a thin layer over a sheet-form substrate and left standing in that form for prolonged periods, so that the liquid phase disappears completely or substantially completely, the remaining film still has the desired permanently tacky pressure-sensitive adhesive properties.

The gel-forming component, particularly dibenzal-sorbitol, is present in quantities of preferably from 1% to 10% by weight and, more particularly, from 1.5% to 4% by weight, again based on the weight of the finished stick. By combining the described components in the specified mixing ratios, it is possible to produce sticks having a compressive strength, measured as described further on, of at least 20N, preferably of at least 25N or even of at least 30N and hence to provide the stick with strength values of the order required for practical application. Compressive strength is measured on cylindrical test specimens 30 mm long and 16 mm in diameter using an Erichsen model 904 compressive force gauge (measuring temperature 21°±1° C.). The 30 mm long test sticks, which are cut planoparallel at their ends, are fixed at their upper and lower ends with exact-fitting plastic caps. The test specimen thus prepared is then placed on the middle of a spindle plate. Approximately 10 mm above the test specimen there is a second plate which is connected to a dial gauge. The lower plate with the test specimen is then pressed mechanically against the upper plate and the value of the greatest needle deflection up to destruction of the test specimen is determined.

In the same way as the hitherto usual adhesive sticks based on soap gel, the sticks according to the invention are best stored in sealable tube which enable the stick to be screwed out and back in again in the same way as lipstick. If desired, the stick material may contain further additives, such as dyes, perfume, fillers and/or pigments.

In the Figure, the adhesive applicator stick or crayon 1 is surrounded by a sealable tube 2 of metal, plastic or paper.

Another embodiment of the invention relates to the process by which the new adhesive sticks are produced. In this process, the adhesive resin component and the gel-forming component are mixed homogeneously with one another in a suitable form and the resulting mixture subsequently shaped to form the crayon or stick. In the preferred embodiment of the process according to the invention, the adhesive component is first prepared in the presence of limited quantities of water. To this end, an aqueous mixture of the partially neutralized acid phosphate esters of nonionic wetting agents of the lower alkylene oxide adduct type is best rapidly heated to 80°–100° C., after which MVE/MA-copolymer powder is rapidly added with stirring to the reaction mixture. The mixture is reacted at elevated temperature, more particularly at a temperature in the above-mentioned range, for a period of from about 10 to 90 minutes. In general, a reaction time of about 15 to 30 minutes at temperatures of from about 80° to 90° C. is sufficient. The initially cloudy, highly viscous reaction mixture becomes less viscous and lightens in appearance providing the reaction is adequate.

In the next step, limited quantities of water-miscible monofunctional or polyfunctional alcohols or ethers or partial ethers thereof are preferably added. Particularly suitable alcohol components are ethanol, ethylene glycol or monoalkyl ethers of ethylene glycol, particularly monomethyl glycol. Through the addition of the alcohol component, the reaction mixture initially formed becomes clearly transparent.

The gel-forming component dissolved beforehand in limited quantities of a strongly polar solvent, for example N-methyl pyrrolidone, is then introduced into the liquid component now present and thoroughly mixed with the adhesive resin. The homogeneous mixture is poured into stick-form containers, particularly sealable tubes, and solidified therein by cooling.

The adhesive applicator crayons or sticks according to the invention are suitable for applying pressure-sensitive adhesive coatings to paper and/or polymers. However, pressure-sensitive adhesive coatings can also be formed on films of thermoplastic plastics and/or metals. Compared with conventional adhesive sticks, therefore, the adhesive sticks according to the invention may be used for a much wider variety of applications.

The following examples are illustrative of the invention without being limitative thereto.

EXAMPLE 1

In a 250-ml-capacity stirrer-equipped flask provided with an intensive reflux condenser, 94.5 g of a complex acid phosphate ester mixture (mainly mono- and diester, partially neutralized to the neutral range, of a nonyl phenol/10 EO-adduct) and 15.2 g of water were mixed and heated in a glycerol bath to approximately 90° C. A white highly viscous mass was formed. 10.5 g of a MVE/MA-copolymer of average molecular weight (specific viscosity of a solution of 1 g of copolymer in 100 ml of MEK at 25° C.=1.0–1.4) in the form of a white powder were then added by being scattered thereon with vigorous stirring, followed by intensive stirring at the temperature of 90° C. After 10 to 15 minutes, the mixture initially became highly viscous so that the stirring speed had to be decreased. After stirring for 30 minutes at 90° C., 15.2 g of ethanol were added. The viscosity of the solution fell drastically in the course of the continued, reaccelerated stirring and the solution became clearer. A solution of 4.3 g of dibenzal sorbitol in 10.3 g of N-methyl pyrrolidone which had been separately prepared by heating to around 100° C. was then added to the mixture with stirring. The temperature of the mixture was then briefly increased to 95°–100° C. in the glycerol bath, after which the mass was poured into stick tubes.

After standing for 1 day at 20° C., the compressive strength of the sticks formed was measured using an Erichsen compressive strength gauge. An average value of 35N/16 mm $\phi$ was determined.

Adhesive layers or films having permanently tacky properties are formed by rubbing the sticks onto a receiving surface.

EXAMPLE 2

A second stick composition having permanently tacky properties is prepared as follows from the same starting materials as in Example 1, but in different quantitative ratios, and using the same procedure:

| | | |
|---|---|---|
| 63.0 g | of complex phosphate ester mixture | 42% by weight |
| 12.0 g | of MVE/MA-copolymer | 8% by weight |
| 30.1 g | of water | 20.1% by weight |
| 30.2 g | of ethanol | 20.1% by weight |
| 10.3 g | of N—methyl pyrrolidone | 6.9% by weight |
| 4.3 g | of dibenzal-sorbitol | 2.9% by weight |
| | | 100.0% by weight |

Once again, permanently tacky layers having good adhesive properties are formed by rubbing the stick onto a receiving surface.

The preceding specific embodiments are illustrative of the practice of the invention. It is to be understood, however, that other expedients known to those skilled in the art or disclosed herein may be employed without departing from the spirit of the invention or the scope of the claims.

We claim:

1. An adhesive applicator crayon or stick comprised of an amount of more than 50% by weight of the finished crayon or stick of an adhesive resin dissolved and/or dispersed in an amount of at most 35% by weight of the finished crayon or stick of an aqueous solvent system, from 1% to 10% by weight of a gel-forming component and, optionally, other conventional additives for adhesive applicator crayons or sticks, whereby, when applied by rubbing onto a receiving surface, the adhesive layer produced has permanently tacky pressure-sensitive adhesive properties, said adhesive applicator crayon or stick consisting essentially of the reaction product of sorbitol and/or xylitol and benzaldehyde, as said gel-forming component, and the reaction mixture from the reaction of 1 part by weight of methyl vinyl ether/maleic acid anhydride copolymers with from 5 to 12 parts by weight of partially neutralized acid phosphate esters of nonionic wetting agents of the lower alkylene oxide adduct type (pH-value of a 10% solution of the phosphate esters being from 5 to 6), as said adhesive resin.

2. The adhesive applicator crayon or stick of claim 1 wherein said adhesive resin is present in an amount of at least 60% by weight of the finished crayon or stick.

3. The adhesive applicator crayon or stick of claim 1 wherein said adhesive resin is present in an amount of from 65% to 75% by weight of the finished crayon or stick.

4. The adhesive applicator crayon or stick of claim 3 wherein said aqueous solvent system is present in an amount of from 20% to 30% by weight of the finished crayon or stick.

5. The adhesive applicator crayon or stick of claim 1 wherein said gel-forming component is present in an amount of from 1.5% to 4% by weight of the finished crayon or stick.

6. The adhesive applicator crayon or stick of claim 1 wherein said crayon or stick has a compressive strength of at least 20N as determined at 21°±1° C. on cylindrical test specimens 30 mm long and 16 mm in diameter using an Erichsen compressive strength gauge.

7. The adhesive applicator crayon or stick of claim 1 wherein said crayon or stick has a compressive strength of at least 30N as determined at 21°±1° C. on cylindrical test specimens 30 mm long and 16 mm in diameter using an Erichsen compressive strength gauge.

8. The adhesive applicator crayon or stick of claim 1 wherein said aqueous solvent system is a homogeneous mixture of (1) water, (2) a liquid having up to 6 carbon atoms selected from the group consisting of alkanols, alkanediols, di-lower alkyl ethers of alkanediols and mono-lower alkyl ethers of alkanediols, and (3) a water-miscible strongly polar solvent.

9. The adhesive applicator crayon or stick of claim 8 wherein said liquid having up to 6 carbon atoms is selected from the group consisting of ethanol, ethylene glycol and the monomethyl ether of ethylene glycol, and said water-miscible strongly polar solvent is N-methyl pyrrolidone.

10. The process of applying pressure-sensitive adhesive coatings having permanent tackiness to a surface comprising rubbing the adhesive applicator crayon or stick of claim 1 on said surface.

* * * * *